United States Patent
Qiu et al.

(10) Patent No.: US 11,971,857 B2
(45) Date of Patent: Apr. 30, 2024

(54) ADAPTIVELY PROVIDING UNCOMPRESSED AND COMPRESSED DATA CHUNKS

(71) Applicant: Cohesity, Inc., San Jose, CA (US)

(72) Inventors: Zhihuan Qiu, San Jose, CA (US); Yinzen Hwang, Newark, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 17/545,655

(22) Filed: Dec. 8, 2021

(65) Prior Publication Data

US 2023/0177011 A1 Jun. 8, 2023

(51) Int. Cl.
G06F 16/174 (2019.01)

(52) U.S. Cl.
CPC ............... G06F 16/1744 (2019.01)

(58) Field of Classification Search
CPC ................................................ G06F 16/1744
See application file for complete search history.

(56) References Cited

U.S. PATENT DOCUMENTS

| | | | | |
|---|---|---|---|---|
| 5,481,701 | A * | 1/1996 | Chambers, IV | G06V 10/768 711/111 |
| 6,859,557 | B1 * | 2/2005 | Uyttendaele | H04N 21/4728 348/E5.002 |
| 7,236,649 | B2 * | 6/2007 | Fenney | G06T 9/00 382/296 |
| 7,860,843 | B2 * | 12/2010 | Dodd | H03M 7/30 707/693 |
| 8,418,167 | B2 * | 4/2013 | Meller | G06F 8/654 717/169 |
| 8,427,346 | B2 * | 4/2013 | Potkonjak | H03M 7/30 341/51 |
| 8,504,710 | B2 * | 8/2013 | Fallon | G06F 16/2365 709/231 |
| 8,626,726 | B2 * | 1/2014 | Koifman | G06F 21/6209 707/693 |
| 8,918,439 | B2 * | 12/2014 | Alatorre | G06F 16/122 718/1 |
| 9,069,824 | B2 * | 6/2015 | Pompey | G06F 16/2477 |
| 9,330,105 | B1 * | 5/2016 | Duprey | G06F 16/1744 |
| 9,442,950 | B2 * | 9/2016 | Philbin | G06F 16/5862 |
| 9,454,321 | B1 * | 9/2016 | Smaldone | G06F 3/061 |
| 9,588,977 | B1 * | 3/2017 | Wang | G06F 16/13 |
| 9,716,754 | B2 * | 7/2017 | Swift | G06F 16/27 |

(Continued)

OTHER PUBLICATIONS

Jeannot et al., Adaptive Online Data Compression, Proceedings 11th IEEE International Symposium on High Performance Distributed Computing, 2002.

*Primary Examiner* — Mahesh H Dwivedi
*Assistant Examiner* — Huen Wong
(74) *Attorney, Agent, or Firm* — Shumaker & Sieffert, P.A.

(57) ABSTRACT

A selected data chunk associated with an object is determined to be sent to a destination. A chunk compression grouping storing the selected data chunk associated with the object is identified. The identified chunk compression grouping includes a plurality of data chunks compressed together. A data content version that includes the selected data chunk associated with the object to be provided to the destination is determined from a plurality of data content versions based at least in part on a metric associated with the identified chunk compression grouping.

17 Claims, 4 Drawing Sheets

(56) References Cited

U.S. PATENT DOCUMENTS

| | | | |
|---|---|---|---|
| 9,934,145 B2* | 4/2018 | Krishnamurthy | G06F 12/0842 |
| 10,169,359 B1* | 1/2019 | Pinho | G06F 16/182 |
| 10,437,474 B1* | 10/2019 | Armangau | G06F 3/061 |
| 10,645,195 B1* | 5/2020 | Wu | G06F 3/0665 |
| 11,194,498 B1* | 12/2021 | Si | G06F 3/0608 |
| 11,200,004 B2* | 12/2021 | McIlroy | G06F 16/1744 |
| 11,216,186 B1* | 1/2022 | Armangau | G06F 3/0689 |
| 11,526,469 B1* | 12/2022 | Mathews | G06F 16/1865 |
| 11,539,811 B2* | 12/2022 | Sharaby | G06F 16/215 |
| 2003/0112345 A1* | 6/2003 | Yamaguchi | H04N 1/32112 386/328 |
| 2004/0086039 A1* | 5/2004 | Reynolds | H04N 21/23439 375/240.1 |
| 2004/0179284 A1* | 9/2004 | Martin | G11B 20/00007 |
| 2007/0208893 A1* | 9/2007 | Azzarello | G06F 16/1744 710/68 |
| 2009/0063510 A1* | 3/2009 | Yamagishi | H04N 21/8543 |
| 2009/0307250 A1* | 12/2009 | Koifman | G06F 21/62 |
| 2010/0036863 A1* | 2/2010 | Koifman | H03M 7/30 707/602 |
| 2010/0121972 A1* | 5/2010 | Samuels | H04L 47/26 709/234 |
| 2010/0281004 A1* | 11/2010 | Kapoor | G06F 16/24561 707/693 |
| 2011/0219144 A1* | 9/2011 | Amit | G06F 16/00 709/247 |
| 2012/0089579 A1* | 4/2012 | Ranade | G06F 16/183 707/693 |
| 2012/0158647 A1* | 6/2012 | Yadappanavar | G06F 16/1744 707/E17.005 |
| 2013/0275396 A1* | 10/2013 | Condict | H03M 7/30 707/693 |
| 2014/0207745 A1* | 7/2014 | Groseclose | H03M 7/30 707/693 |
| 2015/0193342 A1* | 7/2015 | Ohara | G06F 12/0802 711/120 |
| 2016/0004598 A1* | 1/2016 | Lillibridge | G06F 11/1448 707/693 |
| 2020/0042219 A1* | 2/2020 | Wang | G06F 3/0689 |
| 2020/0226102 A1* | 7/2020 | Natanzon | G06F 16/1744 |
| 2020/0241805 A1 | 7/2020 | Armangau | |
| 2020/0249877 A1* | 8/2020 | McIlroy | G06F 16/1744 |
| 2020/0285618 A1* | 9/2020 | Albericio Latorre | G06F 16/156 |
| 2020/0341647 A1* | 10/2020 | McSweeney | G06F 16/1744 |
| 2020/0349117 A1* | 11/2020 | Faibish | G06F 16/1744 |
| 2021/0034348 A1* | 2/2021 | Cerny | G06F 16/1752 |
| 2021/0133060 A1* | 5/2021 | David | G06F 11/1662 |
| 2021/0141729 A1* | 5/2021 | Rao | G06F 12/0848 |
| 2021/0144226 A1* | 5/2021 | De Icaza Amozurrutia | G06F 16/183 |
| 2021/0165575 A1* | 6/2021 | Hutcheson, Jr. | G06F 3/0604 |
| 2022/0075544 A1* | 3/2022 | Gupta | G06F 3/065 |
| 2022/0083250 A1* | 3/2022 | Gupta | G06F 3/0604 |
| 2022/0129430 A1* | 4/2022 | Trimble | H04L 69/04 |
| 2022/0197868 A1* | 6/2022 | Dovzhenko | G06F 16/1744 |

* cited by examiner

ADAPTIVELY PROVIDING UNCOMPRESSED AND COMPRESSED DATA CHUNKS

BACKGROUND OF THE INVENTION

A storage system may store data chunks associated with an object in a compressed format. The storage system may perform a data management operation (e.g., restore, migration, replication, tier) and provide the data chunks associated with the object to a destination system. A load on the storage system, a load on the destination system, and/or network bandwidth affects a performance of the data management operation. As a result, the storage system, the destination system, and/or a network connection between the storage system and the destination system may become a bottleneck while the data management operation is being performed.

BRIEF DESCRIPTION OF THE DRAWINGS

Various embodiments of the invention are disclosed in the following detailed description and the accompanying drawings.

DETAILED DESCRIPTION

Figure 1:
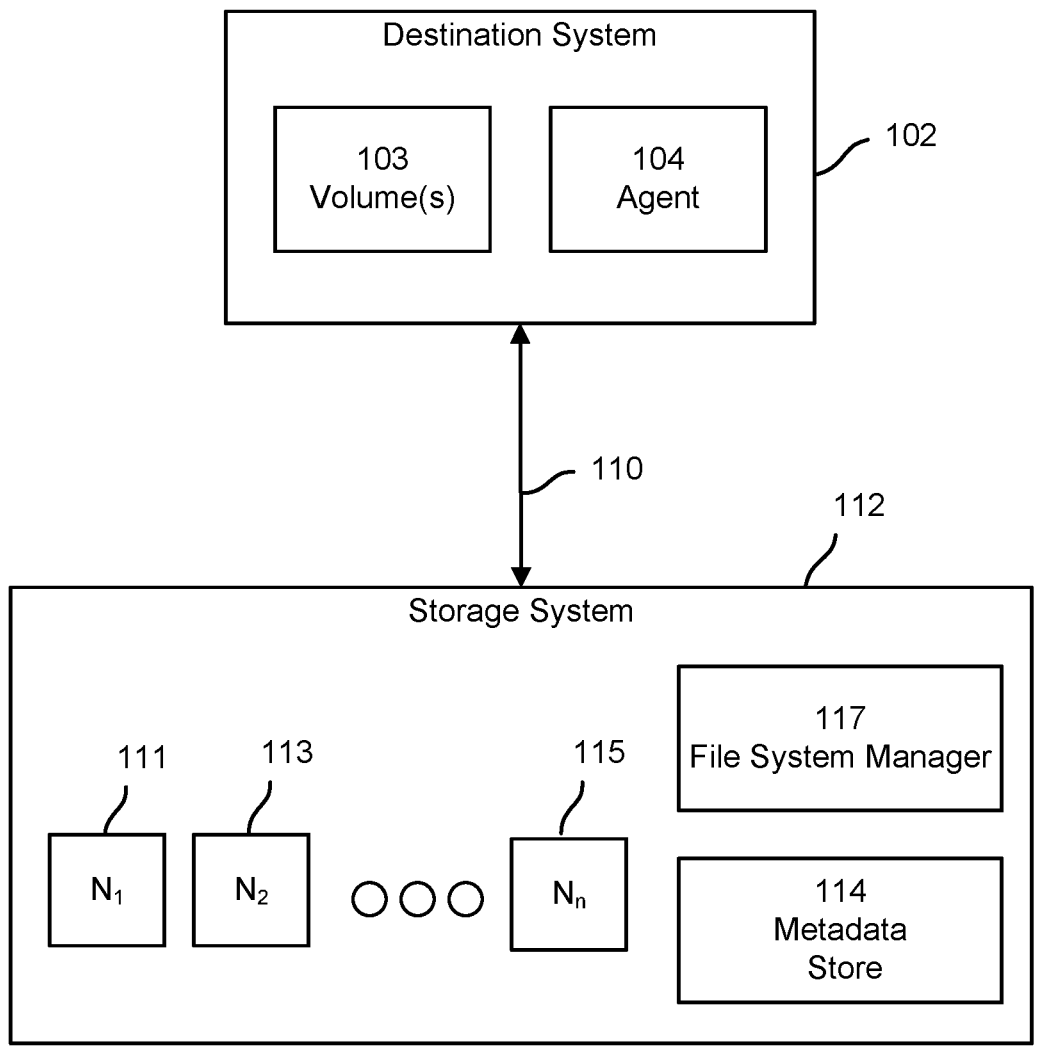
FIG. 1 is a block diagram illustrating an embodiment of a system for adaptively providing compressed and uncompressed data chunks.

A technique to adaptively transmit compressed and uncompressed data chunks is disclosed herein. A storage system receives a request to restore an object to a destination system. Although the technique is described with respect to restoring an object, the technique disclosed herein may be applicable whenever a data management operation (e.g., restore, migration, replication, tier, etc.) is performed for a cohort of data that is provided from a storage system to a destination system.

The storage system stores data chunks associated with the object in a plurality of chunk files. Each of the chunk files may include one or more chunk compression groups comprised of a corresponding subset of the data chunks associated with the object. A subset of the data chunks associated with the object are coalesced (e.g., combined), compressed, and encrypted to form a chunk compression group having at least a threshold size. The chunk compression group may be stored in a first chunk file. A chunk file may store data chunks associated with one or more objects. A chunk compression group may include data chunks associated with one or more objects. Some objects stored by the storage system (e.g., a virtual machine disk file) may not be uniformly compressible. For example, some portions of an object are very compressible and other portions of an object are not very compressible.

In a first example, a first portion of an object may include data chunks C1, C2, C3, and C4. Data chunks C1, C2, C3, and C4 may each have a size of 16 kb. The storage system may coalesce, compress, and encrypt the data chunks to form a first chunk compression group. The first chunk compression group is stored in a first chunk file. A cumulative size of data chunks C1, C2, C3, and C4 is 64 kb, but after being coalesced, compressed, and encrypted, the first chunk compression group may have a size of 10 kb.

In a second example, a second portion of an object may include data chunks C5 and C6. Data chunks C5 and C6 may each have a size of 32 kb. The storage system may coalesce, compress, and encrypt the data chunks to form a second chunk compression group. The second chunk compression group may be stored in a second chunk file. A cumulative size of data chunks C5 and C6 is 64 kb, but after being coalesced, compressed, and encrypted, the second chunk compression group may have a size of 64 kb.

The first portion of the object may be considered to be a "very compressible" portion of the object and the second portion of the object may be considered to be a "not very compressible" portion of the object. The manner in which the data chunks included in a chunk compression group are provided to a destination system may affect the amount of time and resources needed to restore the object to the destination system.

Other storage systems may decompress a chunk compression group and send either uncompressed data chunk(s) included in the chunk compression group that are needed to restore the object or send compressed data chunk(s) included in the chunk compression group that are needed to restore the object. These other storage systems do not adapt to the environment associated with the storage system, the network, and the destination system. As a result, additional time and computing resources may be needed to restore an object from the storage system to the destination system.

Using the technique disclosed herein, the storage system may adaptively determine the manner in which the data chunks included in a chunk compression group are provided to the destination system. The disclosed technique includes determining a compression ratio associated with a chunk compression group and utilizing the determined compression ratio to select a data content version of the data chunks associated with an object that are included in a chunk compression group to restore to the destination system. A first data content version includes data chunks associated with an object that includes all of the data chunks included in the chunk compression group. A second data content version includes compressed data chunk(s) included in the chunk compression group that are needed to restore the object. A third data content version includes uncompressed data chunk(s) included in the chunk compression group that are needed to restore the object.

The storage system receives a request to restore an object to a destination system. The storage system maintains a plurality of data structures that enable the data chunks associated with the object to be located. One of the data structures is a chunk file metadata data structure that is comprised of a plurality of entries. An entry corresponds to a chunk file and associates a chunk file identifier associated with the chunk file with one or more chunk identifiers associated with one or more data chunks stored in the chunk file.

The storage system utilizes the chunk file metadata data structure to locate the data chunks associated with the object to be restored to the destination system. In some embodiments, some of the data chunks associated with the object are stored in a chunk compression group. In some embodiments, some of the data chunks associated with the object are not stored in a chunk compression group.

An entry of the chunk file metadata data structure may indicate whether a data chunk associated with the entry is included in a chunk compression group associated with the chunk file. For a data chunk that is not included in a chunk compression group associated with the chunk file, the entry may include a checksum, offset, and size for the data chunk. The offset and size indicate a location of the data chunk within the chunk file. The storage system may utilize the offset and size to locate the data chunk and provide a compressed or uncompressed version of the data chunk to the destination system.

For a data chunk that is included in a chunk compression group associated with the chunk file, the entry may include a checksum, offset, size of the data chunk within the chunk compression group (i.e., the size of the data chunk after compression), and a logical size of the data chunk (i.e., size of the data chunk before compression). The offset and size of the data chunk within the chunk compression group indicate a location of the data chunk within the chunk compression group. The storage system may utilize the offset and size to locate the data chunk within the chunk compression group and provide the data chunk to the destination system. A compression ratio of the chunk compression group that includes the selected data chunk may be determined by dividing a sum of the logical sizes of the data chunks included in the chunk compression group by a size of the chunk compression group. A compression ratio for a data chunk may be estimated to be the compression ratio of the chunk compression group. In some embodiments, a chunk compression group is comprised of a plurality of data chunks. In some embodiments, a chunk compression group is comprised of a single data chunk. The compression ratio of the single data chunk may be determined to be the compression ratio of the chunk compression group.

While the object is being restored to a destination system, the storage system monitors one or more conditions. The one or more conditions may include a load on the storage system, a load on the destination system, and/or network bandwidth, etc. The storage system may adaptively change the data content version of data chunks associated with an object that are provided based on a current state of the one or more conditions. This reduces the likelihood that the storage system, destination system, or a network connection may become a bottleneck while the object is being restored to the destination system.

In some embodiments, a first data content version of data chunks associated with an object provided by the storage system includes the chunk compression group that includes one or more data chunks associated with the object. A header associated with the first data content version may indicate that a chunk compression group is provided. In response to the indication, the destination system decompresses the chunk compression group, extracts one or more data chunks needed to restore the object from the decompressed chunk compression group, and assembles the object into an original data format using the one or more extracted data chunks. This version may be provided when the chunk compression group has a compression ratio greater than or equal to a compression ratio threshold (e.g., the data chunks included in the chunk compression group as a group are very compressible), a load on the storage system is greater than a first threshold load, a load on the destination system is less than a second threshold load, and/or a size of the chunk compression group is unlikely to cause the network connection to become a bottleneck. In some embodiments, the first data content version is the default data content version. The default data content version may be provided when a load on the storage system, a load on the destination system, and/or available network bandwidth is unable to be determined.

In some embodiments, a second data content version of the data chunks associated with an object provided by the storage system includes one or more compressed data chunks needed to restore the object that are included in a chunk compression group associated with the object. The storage system decompresses the chunk compression group, extracts one or more data chunks needed to restore the object from the decompressed chunk compression group, compresses the one or more extracted data chunks, encrypts the one or more compressed data chunks, and provides the one or more encrypted data chunks to the destination system. A header associated with the second data content version may indicate that one or more compressed data chunks needed to restore the object are provided. In response to the indication, the destination system decrypts the one or more encrypted data chunks, decompresses the one or more compressed data chunks and assembles the object into an original data format using the one or more decompressed data chunks. This version may be provided when the one or more data chunks included in the chunk compression group that are needed to restore the object have a compression ratio greater than or equal to the compression ratio threshold, a load on the storage system is less than the first threshold load, a load on the destination system is less than the second threshold load, and/or a size of the chunk compression group and/or a size of the uncompressed extracted data chunks may cause the network connection to become a bottleneck. In some embodiments, encrypting the one or more compressed data chunks is optional.

In some embodiments, a third data content version of the data chunks associated with an object provided by the storage system includes one or more uncompressed data chunks needed to restore the object that are included in a chunk compression group associated with the object. The storage system decompresses the chunk compression group, extracts one or more data chunks needed to restore the object from the decompressed chunk compression group, encrypts the one or more extracted data chunks, and provides the one or more encrypted data chunks to the destination system. A header associated with the third data content version may indicate that one or more uncompressed data chunks needed to restore the object are provided. In response to the indication, the destination system decrypts the one or more encrypted data chunks and assembles the object into an original data format using the one or more uncompressed data chunks. This version may be provided when the one or more data chunks included in the chunk compression group that are needed to restore the object have a compression ratio less than the compression ratio threshold, a load on the destination system is greater than or equal to the second threshold load, and/or a size of the chunk compression group may cause the network connection to become a bottleneck. In some embodiments, encrypting the one or more uncompressed data chunks is optional.

Additional factors (e.g., quality of service (QoS) requirements associated with a data management operation, a policy, egress cost, transfer fees, compute cost, historical loads on the source system, historical loads on the destination system, historical network bandwidth, etc.) may be utilized by the storage system when determining which data content version to provide during a restoration of the object.

In some embodiments, a model is utilized to adaptively determine which data content version is to be provided to the destination system. The model may be a machine learning model, a rules-based model, a heuristic model, etc. In some embodiments, a machine learning model is trained to select a data content version based on one or more of QoS requirements associated with a data management operation, a policy, egress cost, transfer fees, compute cost, historical loads on the source system, historical loads on the destination system, and/or historical network bandwidth.

The machine learning model may be trained using a supervised machine learning algorithm. For example, the supervised machine learning algorithm may be a linear regression algorithm, a logistical regression algorithm, a random forest algorithm, a gradient boosted trees algorithm, a support vector machines algorithm, a neural networks algorithm, a decision tree algorithm, a Naïve Bayes algorithm, a nearest neighbor algorithm, or any other type of supervised machine learning algorithm. In some embodiments, the machine learning model is trained using a semi-supervised machine learning algorithm that utilizes one or more labeled data sets and one or more pseudo-labeled data sets. In the embodiments, the machine learning model is trained using a reinforcement machine learning algorithm. For example, the reinforcement machine learning algorithm may be a Q-Learning algorithm, a temporal difference algorithm, a Monte-Carlo tree search algorithm, an asynchronous actor-critic agent's algorithm, or any other type of reinforcement machine learning algorithm. In some embodiments, the machine learning model is trained using an unsupervised machine learning algorithm. Examples are clustering methods, anomaly detection, neural network, etc.

FIG. 1 is a block diagram illustrating an embodiment of a system for adaptively providing compressed and uncompressed data chunks. System 100 includes destination system 102 and storage system 112. Destination system 102 is coupled to storage system 112 via connection 110. Connection 110 may be a wired or wireless connection. Connection 110 may be a LAN, WAN, intranet, the Internet, and/or a combination thereof. Although three storage nodes are shown, storage system 112 may be comprised of n storage nodes.

In some embodiments, destination system 102 and storage system 112 are in the same datacenter. In some embodiments, destination system 102 and storage system 112 are in different datacenters. In some embodiments, destination system 102 is in a datacenter and storage system 112 is a cloud instantiation of a source system.

In some embodiments, destination system 102 is a primary system. In some embodiments, destination system 102 is a remote system that is different than a primary system. Destination system 102 may be a server, a virtual machine, a database, and/or a computing device to which data is transmitted. Destination system 102 may be comprised of one or more servers, one or more computing devices, one or more storage devices, and/or a combination thereof. Destination system 102 includes one or more storage volumes 103 that are configured to store data chunks associated with an object that are provided by storage system 112. An object may be a content file, a data file, a log file, a database file, a content file, a virtual machine disk file, a container, an application, an application file, a database, etc.

In some embodiments, the storage nodes of storage system 112 are homogenous nodes where each storage node has the same capabilities (e.g., processing, storage, memory, etc.). In some embodiments, at least one of the storage nodes of a storage system is a heterogeneous node with different capabilities (e.g., processing, storage, memory, etc.) than the other storage nodes of a storage system.

In some embodiments, a storage node of storage system 112 includes a processor, memory, and a plurality of storage devices. The plurality of storage devices may include one or more solid state drives, one or more hard disk drives, or a combination thereof. Backed up data may be stored in the one or more solid state drives, one or more hard disk drives, or a combination thereof.

In some embodiments, a storage node of storage system 112 includes a processor and memory, and is coupled to a separate storage device. The separate storage device may include one or more storage devices (e.g., flash storage devices). A storage device may be segmented into a plurality of partitions. Each of the storage nodes may be allocated one or more of the partitions. The one or more partitions allocated to a storage node may be configured to store data associated with some or all of the changed objects that were backed up to the storage system. For example, the separate storage device may be segmented into 10 partitions and the storage system 112 may include 10 storage nodes. A storage node of the 10 storage nodes may be allocated one of the 10 partitions.

In some embodiments, a storage node of storage system 112 includes a processor, memory, and a storage device. The storage node may be coupled to a separate storage device. The separate storage device may include one or more storage devices. A storage device may be segmented into a plurality of partitions. Each of the storage nodes may be allocated one or more of the partitions. The one or more partitions allocated to a storage node may be configured to store data associated with some or all of the changed objects that were backed up to the storage system. For example, the separate storage device may be segmented into 10 partitions and storage system 112 may include 10 storage nodes. A storage node of the 10 storage nodes may be allocated one of the 10 partitions.

In some embodiments, storage system 112 is a cloud instantiation of a storage system. A configuration of a cloud instantiation of storage system 112 may be a virtual replica of a storage system. For example, a storage system may be comprised of three storage nodes, each storage node with a storage capacity of 10 TB. A cloud instantiation of the storage system may be comprised of three virtual nodes, each virtual node with a storage capacity of 10 TB. In other embodiments, a cloud instantiation of a storage system may have more storage capacity than an on-premises instantiation of a storage system. In other embodiments, a cloud instantiation of a storage system may have less storage capacity than an on-premises instantiation of a storage system.

Storage system 112 performs a data management operation for a source system. In some embodiments, the source system is destination system 102. Storage system 112 may have received a cohort of data from the source system, ingested the received data, and stored the data as a plurality of encrypted data chunks in one or more chunk files that are stored in one or more storage devices associated with one or more storage nodes 111, 113, 115 of storage system 112.

File system manager 117 generates metadata that enables the data chunks associated with the data management operation to be located. For example, the storage system may generate, as described herein, a tree data structure that includes a snapshot tree and a plurality of object metadata structures. An example of the metadata generated by file system manager 117 is described in U.S. patent application Ser. No. 17/215,865 entitled "Deduplicating Metadata Based On A Common Sequence Of Chunk Identifiers," filed on Mar. 29, 2021.

A snapshot tree includes a root node, one or more levels of one or more intermediate nodes associated with the root node, and one or more leaf nodes associated with an intermediate node of the lowest intermediate level. The root node of a snapshot tree includes one or more pointers to one or more intermediate nodes. Each intermediate node includes one or more pointers to other nodes (e.g., a lower intermediate node or a leaf node). A leaf node may store file system metadata (e.g., owner, created, last update, size, permissions, etc.), data associated with a content file that is less than or equal to a limit size (e.g., 256 kB), an identifier of a data brick, one or more pointers to one or more metadata structures (e.g., Blob structure), etc. A leaf node of the snapshot tree may correspond to an Mode.

A metadata structure may be generated for an object that is greater than the limit size (e.g., 256 kB) and was included in the backup. The metadata structure is configured to store the metadata associated with an object that enables the data chunks associated with the object to be located. The metadata structure includes a root node, one or more levels of one or more intermediate nodes associated with the root node, and one or more leaf nodes associated with an intermediate node of the lowest intermediate level. A metadata structure is similar to a snapshot tree, but a leaf node of a metadata structure includes an identifier of a data brick associated with one or more data chunks of the content file and metadata associated with the one or more data chunks (e.g., chunk identifier, chunk file identifier, etc.). A leaf node of the snapshot tree may include a pointer to a root node of the metadata structure corresponding to an object.

The location of the one or more data chunks associated with a data brick may be identified using one or more data structures (e.g., list, table, etc.). A first data structure (e.g., chunk metadata data structure) may store information that associates a plurality of chunk identifiers (e.g., SHA-1 hash value) with their corresponding chunk file identifiers. This indicates that a data chunk having a particular chunk identifier is stored in a chunk file having a particular chunk file identifier.

A second data structure (e.g., a chunk file metadata data structure) may associate a chunk file identifier associated with a chunk file with one or more data chunks stored in the chunk file. The one or more tree data structures, the first data structure, and the second data structure may be stored in metadata store 114, which may be stored in at least one of the memories of nodes 111, 113, 115.

File system manager 117 may determine a location of one or more data chunks associated with an object by traversing a metadata structure corresponding to an object to leaf nodes that store corresponding brick identifiers associated with a data brick. The one or more data chunks associated with the data brick having the brick identifier may be located based on the chunk metadata data structure (e.g., a table) and the chunk file metadata data structure. For example, a first data brick having a first brick identifier may be associated with a first chunk identifier (e.g., SHA-1 hash value). The first chunk identifier may be used in conjunction with the chunk metadata data structure to identify a chunk file identifier. A chunk file having the identified chunk file identifier is comprised of a plurality of data chunks. The chunk file metadata data structure may be used to identify a corresponding location for each of the plurality of data chunks.

A chunk file may be comprised of one or more chunk compression groups that include a corresponding plurality of encrypted data chunks. In some embodiments, a chunk file is comprised of one or more chunk compression groups and one or more encrypted data chunks that are not included in a chunk compression group. In some embodiments, a chunk file is comprised of a plurality of encrypted data chunks that are not included in a chunk compression group. A data chunk that is not included in a chunk compression group may or may not be compressed.

Storage system 112 may ingest, coalesce, compress, and encrypt a plurality of data chunks associated with an object to form a chunk compression group. In some embodiments, a chunk compression group has a compression ratio within a compression tolerance. An entry of the chunk file metadata data structure may indicate whether a data chunk associated with the entry is included in a chunk compression group associated with the chunk file.

For a data chunk that is not included in a chunk compression group associated with the chunk file, the entry of the chunk file metadata data structure includes a checksum, offset, and size for the data chunk. The offset and size indicate a location of the data chunk within the chunk file. For a data chunk that is included in a chunk compression group associated with the chunk file, the entry of the chunk file metadata data structure includes a checksum, offset, size of the data chunk within the chunk compression group (i.e., the size of the data chunk after compression), and a logical size of the data chunk (i.e., size of the data chunk before compression). The offset and size of the data chunk within the chunk compression group indicate a location of the data chunk within the chunk compression group.

Storage system 112 may determine one or more metrics based on the chunk file metadata data structure. For example, storage system 112 may determine a compression ratio for each data chunk included in a chunk compression group. Storage system 112 may determine a compression ratio for the chunk compression group.

Agent 104 may send to storage system 112 a request to perform a data management operation (e.g., a remote procedure call). In some embodiments, the data management operation is specific to an object (e.g., only the object is being restored, migrated, replicated, tiered, etc.). In response, storage system 112 performs the data management operation by providing a plurality of data chunks associated with an object to destination system 102. In some embodiments, the data management operation is associated with previously stored data of a source system (e.g., the previously stored data of the source system includes data chunks to be restored, migrated, replicated, tiered, etc.). In response, storage system 112 performs the data management operation by providing a plurality of data chunks associated with the previously stored data of the source system to destination system 102. In some embodiments, storage system 112 initiates the data management operation without receiving a request from agent 104. For example, a data management operation may be performed according to a schedule. In some embodiments, an entity located outside of destination system 102 requests storage system 112 to perform the data management operation.

Storage system 112 monitors one or more conditions prior to, during, and/or after performing the data management operation. For example, storage system 112 may monitor a load on storage system 112, a load on destination system 102, and/or network bandwidth associated with connection 110, etc. Storage system 112 may adaptively change the data content version of data chunks associated with an object that are provided based on a current state or predicted state of the one or more conditions. This reduces the likelihood that storage system 112, destination system 102, or connection 110 becomes a bottleneck while a data management operation is being performed.

In some embodiments, a first data content version of data chunks associated with an object provided by storage system 112 includes a chunk compression group that includes one or more data chunks associated with an object associated with the data management operation. The chunk compression group may include one or more data chunks that are associated with one or more different objects. Storage system 112 provides the chunk compression group that includes one or more data chunks needed to perform the data management operation to destination system 102. A header associated with the first data content version may indicate that a chunk compression group is provided. In response to the indication, agent 104 decompresses the chunk compression group, decrypts the one or more data chunks needed to restore the object from the decompressed chunk compression group, extracts one or more data chunks needed to restore the object from the decompressed chunk compression group, and assembles the object into an original data format using the one or more extracted data chunks. This version may be provided when the chunk compression group has a compression ratio greater than or equal to a compression ratio threshold, a load on storage system 112 is greater than a first threshold load, a load on destination system 102 is less than a second threshold load, and/or a size of the chunk compression group is unlikely to cause the connection 110 to become a bottleneck.

In some embodiments, a second data content version of the data chunks associated with an object provided by storage system 112 includes one or more compressed data chunks needed to perform a data management operation that are included in a chunk compression group associated with the object. Storage system 112 decompresses the chunk compression group, decrypts the data chunks included in the chunk compression group, extracts one or more data chunks needed to perform the data management operation from the decompressed chunk compression group, compresses the one or more extracted data chunks, encrypts the one or more compressed data chunks, and provides the one or more encrypted data chunks to destination system 102. A header associated with the second data content version may indicate that one or more compressed data chunks needed to restore the object are provided. In response to the indication, agent 104 decrypts the data chunks, decompresses the one or more compressed data chunks, and assembles the object into an original data format using the one or more decompressed data chunks. This version may be provided when the one or more data chunks needed to perform the data management operation have a compression ratio greater than or equal to the compression ratio threshold, a load on storage system 112 is less than the first threshold load, a load on destination system 102 is less than the second threshold load, and/or a size of the chunk compression group may cause the connection 110 to become a bottleneck. Storage system 112 sequentially decompresses the chunk compression group. In some embodiments, a first data chunk needed to perform the data management operation is located at the beginning of the chunk compression group. In such embodiments, storage system 112 decompresses a first part of the chunk compression group, extracts the first data chunk, and does not decompress the remainder of the chunk compression group. In some embodiments, encrypting the one or more compressed data chunks is optional.

In some embodiments, a third data content version of the data chunks associated with an object provided by storage system 112 includes one or more uncompressed data chunks needed to perform a data management operation that are included in a chunk compression group associated with the object. Storage system 112 decompresses the chunk compression group, decrypts the one or more data chunks included in the chunk compression group, extracts one or more data chunks needed to restore the object from the decompressed chunk compression group, encrypts the one or more extracted data chunks, and provides the one or more encrypted data chunks to destination system 102. A header associated with the third data content version may indicate that one or more uncompressed data chunks needed to restore the object are provided. In response to the indication, agent 104 decrypts the one or more encrypted data chunks and assembles the object into an original data format using the one or more uncompressed data chunks. This version may be provided when the available network bandwidth associated with connection 110 is greater than the network bandwidth threshold, the one or more data chunks needed to restore the object have a compression ratio less than the compression ratio threshold, and/or a size of the chunk compression group might cause the connection 110 to become a bottleneck. In some embodiments, encrypting the one or more uncompressed data chunks is optional.

Figure 2:
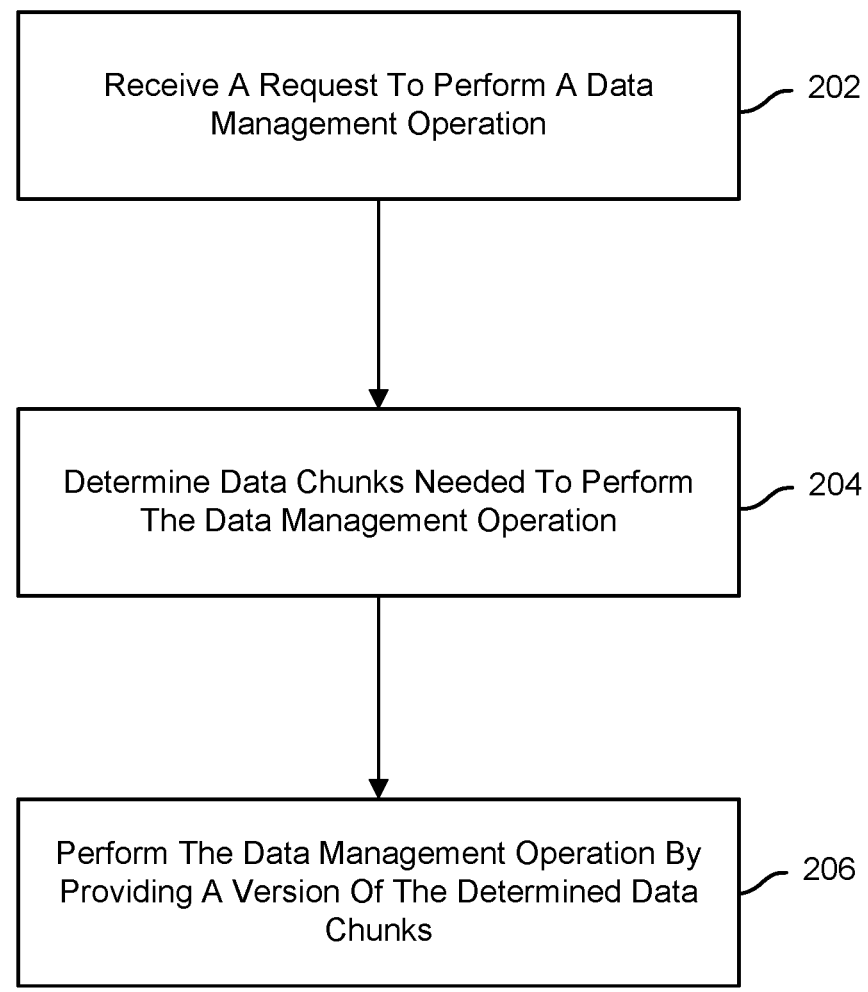
FIG. 2 is a flow diagram illustrating an embodiment of a process for adaptively providing compressed and uncompressed data chunks.

FIG. 2 is a flow diagram illustrating an embodiment of a process for adaptively providing compressed and uncompressed data chunks. In the example shown, process 200 may be implemented by a storage system, such as storage system 112.

At 202, a request to perform a data management operation is received. An agent hosted on a destination system may utilize an RPC call to send to a storage system a request to perform the data management operation. In some embodiments, the data management operation is specific to an object (e.g., only the object is being restored, migrated, replicated, tiered, etc.). In some embodiments, the data management operation is specific to a previous backup of a source system at a particular moment in time (e.g., the backed up data of the source system includes data chunks of one or more objects to be restored, migrated, replicated, tiered, etc.). In some embodiments, the request is received from an entity remote from the destination system.

In some embodiments, the data management operation is initiated by the storage system and step 202 is optional. For example, the storage system may determine to replicate data to another data center.

At 204, data chunks needed to perform the data management operation are determined. The data chunks associated with an object are stored in one or more chunk files. The storage system stores metadata that enables the data chunks associated with the object to be located. The metadata may include a tree data structure, a chunk metadata data structure, and/or a chunk file metadata data structure. The storage system utilizes the metadata to determine the data chunks needed to perform the data management operation.

In some embodiments, the data management operation is specific to an object. The storage system utilizes the metadata to determine the data chunks needed to perform the data management operation with respect to the specified object.

In some embodiments, the data management operation is specific to a previous backup of a source system that includes the object at a particular moment in time. The storage system utilizes the metadata to determine the data chunks needed to perform the data management operation with respect to the one or more objects associated with the previous backup of the source system.

The storage system maintains a chunk file metadata data structure that indicates which storage node(s) store a chunk file. The chunk file metadata data structure is comprised of a plurality of entries. An entry corresponds to a chunk file and associates a chunk file identifier associated with the chunk file with one or more chunk identifiers associated with one or more data chunks stored in the chunk file. The storage system utilizes the chunk file metadata data structure to identify the one or more chunk files that include data chunks that are needed to perform the data management operation.

An entry may indicate whether a data chunk associated with the entry is included in a chunk compression group associated with the chunk file. In some embodiments, all of the data chunks included in a chunk compression group are needed to perform the data management operation. In some embodiments, some of the data chunks included in a chunk compression group are needed to perform the data management operation. In some embodiments, none of the data chunks included in a chunk compression group are needed to perform the data management operation.

For one or more data chunks that are needed to perform the data management operation and included in a chunk compression group, the storage system determines whether to provide the chunk compression group to a destination system or to decompress the chunk compression group and only provide the one or more data chunks that are needed to perform the data management operation (either in a compressed or uncompressed format).

At 206, the data management operation is performed by providing a data content version of the determined data chunks. A first data content version of the determined data chunks includes a chunk compression group that includes the determined data chunks. A second data content version of the determined data chunks includes a compressed version of the one or more data chunks included in a chunk compression group that are needed to perform the data management operation. A third data content version of the determined data chunks includes an uncompressed version of the one or more data chunks included in a chunk compression group that are needed to perform the data management operation.

The storage system monitors one or more conditions prior to, during, or after the data management operation is performed. The one or more conditions may include a load on the storage system, a load on the destination system, network bandwidth, etc. The storage system may adaptively change the version of the determined data chunks that are provided based on a current state or expected state of the one or more conditions.

Figure 3:
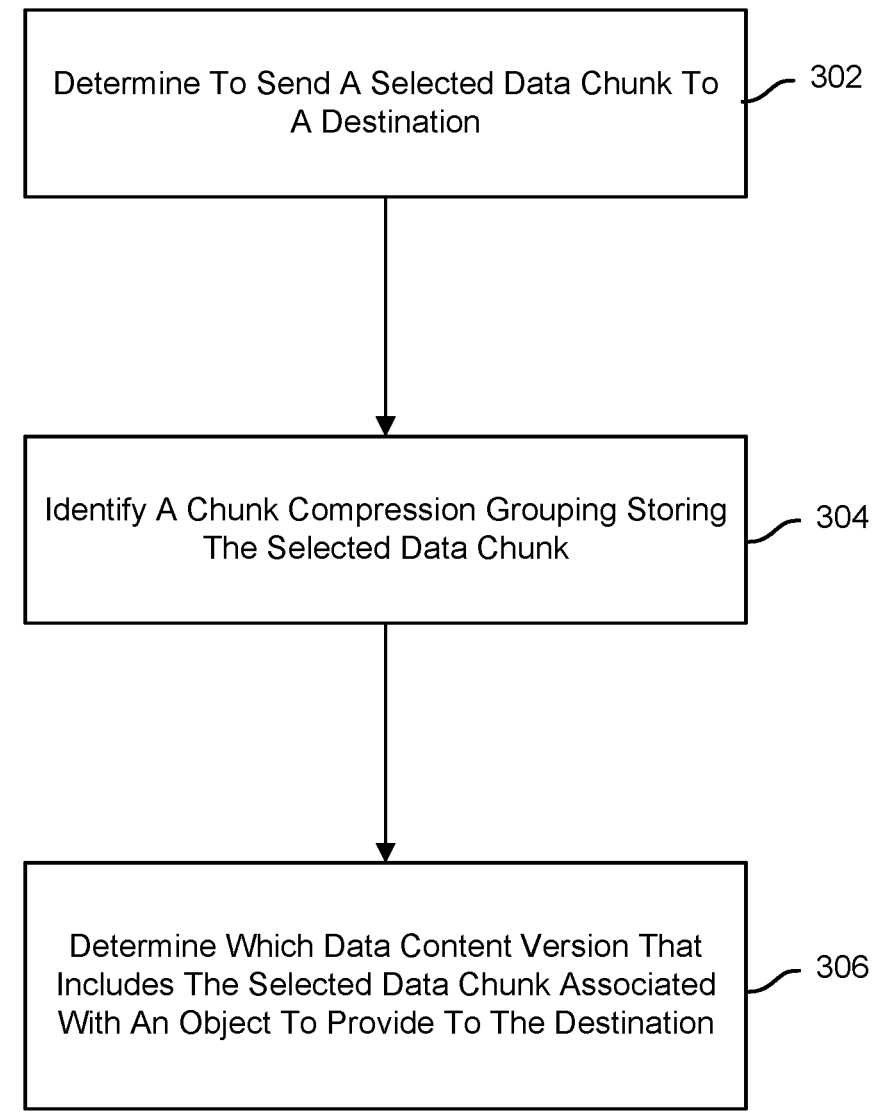
FIG. 3 is a flow diagram illustrating an embodiment of a process for determining a data content version of a data chunk to provide.

FIG. 3 is a flow diagram illustrating an embodiment of a process for determining a data content version of a data chunk to provide. In the example shown, process 300 may be implemented by a storage system, such as storage system 112. In some embodiments, process 300 is implemented to perform some of step 204 of process 200.

At 302, a selected data chunk is determined to be sent to a destination. The data chunk is included in a chunk compression group that is stored in a chunk file. The data chunk is part of an object that is to be restored to the destination.

At 304, a chunk compression grouping storing the selected data chunk is identified. The storage system maintains a chunk file metadata data structure that indicates the one or more data chunks included in a plurality of chunk files stored by the storage system. The chunk file metadata data structure may indicate whether a chunk file is comprised of one or more chunk compression groups that are each comprised of one or more corresponding data chunks.

An entry may indicate whether the selected data chunk is included in a chunk compression group associated with the chunk file. The storage system may inspect the entry corresponding to the chunk entry storing the selected data chunk to determine whether the selected data chunk is included in a chunk compression group. If the selected data chunk is not included in a chunk compression group associated with the chunk file, the entry includes a checksum, offset, and size for the selected data chunk. The offset and size indicate a location of the data chunk within the chunk file.

If the selected data chunk is included in a chunk compression group associated with the chunk file, the entry includes a checksum, offset, size of the selected data chunk within the chunk compression group (i.e., the size of the data chunk after compression), a logical size of the selected data chunk (i.e., size of the selected data chunk before compression), etc. The offset and size of the selected data chunk within the chunk compression group indicate a location of the data chunk within the chunk compression group.

A compression ratio of the chunk compression group that includes the selected data chunk may be determined by dividing a sum of the logical sizes of the data chunks included in the chunk compression group by a size of the chunk compression group. A compression ratio of the selected data chunk may be estimated to be the compression ratio of the chunk compression group.

At 306, it is determined which version of data content that includes the selected data chunk associated with an object is to be provided to the destination based on one or more conditions. The storage system monitors one or more conditions prior to, during, or after performing a data management operation and determines which data content version to provide to the destination. The storage system may monitor a load on the storage system, a load on the destination system, available network bandwidth, etc.

In some embodiments, the determined version of data content is the chunk compression group that includes the selected data chunk. In some embodiments, the determined version of data content is an encrypted and uncompressed version of the selected data chunk. In some embodiments, the determined version of data content is an encrypted and compressed version of the selected data chunk.

Figure 4:
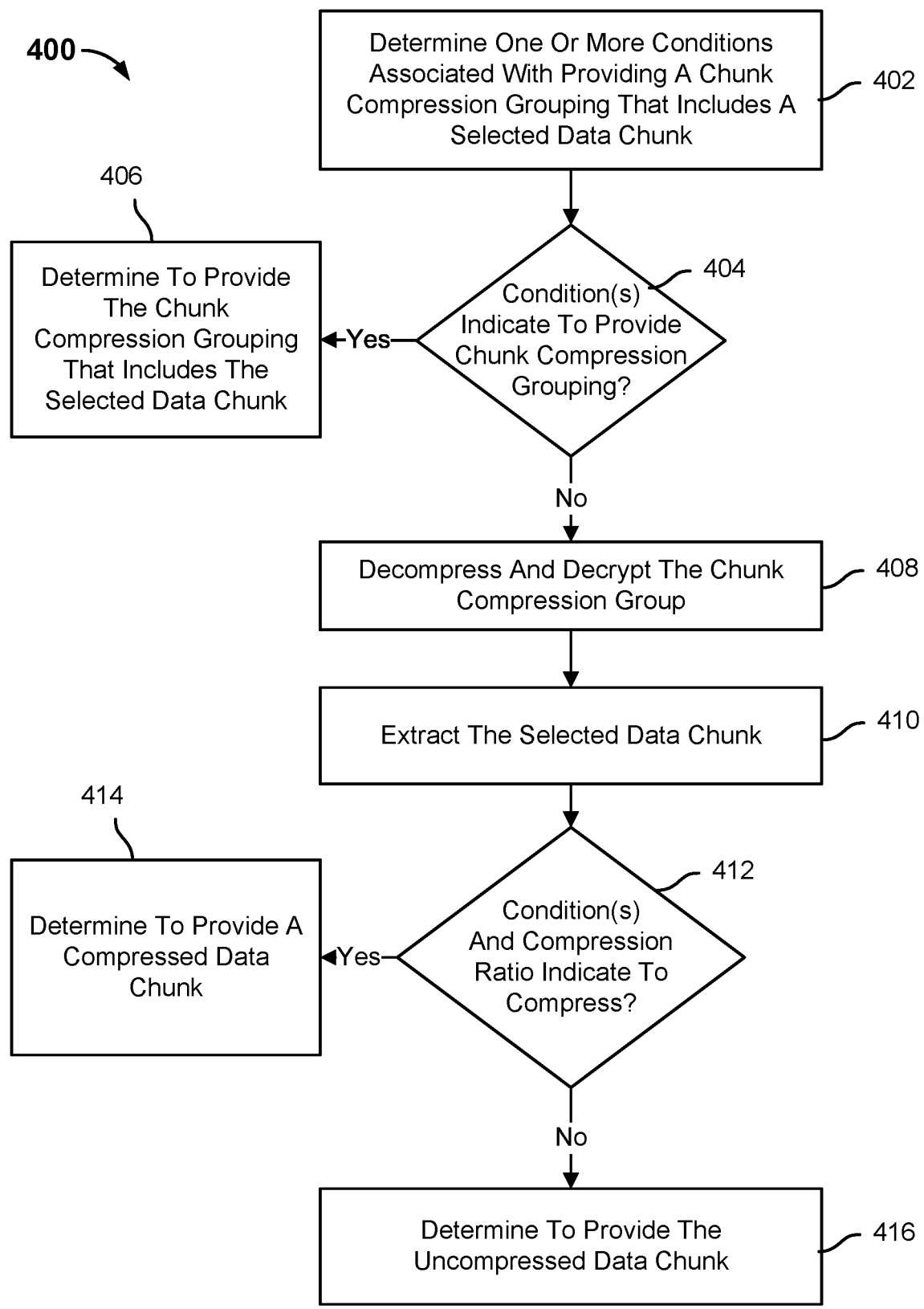
FIG. 4 is a flow diagram illustrating an embodiment of a process for determining a data content version of a data chunk to provide.

FIG. 4 is a flow diagram illustrating an embodiment of a process for determining a data content version of a data chunk to provide. In the example shown, process 400 may be performed by a storage system, such as storage system 112. In some embodiments, process 400 is implemented to perform some or all of step 306 of process 300.

At 402, one or more conditions associated with providing a chunk compression grouping that includes a selected data chunk are determined. The one or more conditions may include a load on the storage system, a load on the destination system, available network bandwidth, etc. The one or more conditions may be determined prior to, during, and/or after a data management operation is performed.

At 404, it is determined whether the one or more conditions indicate to provide the chunk compression grouping that includes the selected data chunk. The one or more conditions may indicate to provide the chunk compression grouping that includes the selected data chunk when the chunk compression group has a compression ratio greater than or equal to a compression ratio threshold (e.g., the data chunks included in the chunk compression group as a group are very compressible), a load on the storage system is greater than a first threshold load, a load on the destination system is less than a second threshold load, and/or a size of the chunk compression group is unlikely to cause the network connection to become a bottleneck.

In the event the one or more conditions indicate to provide the chunk compression grouping that includes the selected data chunk, process 400 proceeds to 406. In the event the one or more conditions do not indicate to provide the chunk compression grouping that includes the selected data chunk, process 400 proceeds to 408.

At 406, the chunk compression grouping that includes the selected data chunk is determined to be provided. At 408, the chunk compression group that includes the selected data chunk is decompressed and decrypted. At 410, the selected data chunk is extracted.

At 412, it is determined whether the one or more determined conditions and a compression ratio associated with the selected data chunk indicate to compress the selected data chunk. The one or more determined conditions and a compression ratio associated with the selected data chunk may indicate to compress the selected data chunk when the selected data chunk has a compression ratio greater than or equal to the compression ratio threshold, a load on the storage system is less than the first threshold load, a load on the destination system is less than the second threshold load, and/or a size of the chunk compression group and/or a size of the uncompressed extracted data chunks may cause the network connection to become a bottleneck.

In the event the one or more determined conditions and a compression ratio associated with the selected data chunk indicate to compress the selected data chunk, process 400 proceeds to 414. In the event the one or more determined conditions and a compression ratio associated with the selected data chunk do not indicate to compress the selected data chunk, process 400 proceeds to 416.

At 414, the selected data chunk is determined to be compressed. The selected data chunk may be determined to be compressed when the selected data chunk has a compression ratio greater than or equal to the compression ratio threshold, a load on the storage system is less than the first threshold load, a load on the destination system is less than the second threshold load, and/or a size of the chunk compression group that includes the selected data chunk and/or a size of the uncompressed selected data chunk may cause the network connection to become a bottleneck.

At 416, the uncompressed selected data chunk is determined to be provided. The uncompressed selected data chunk may be provided when the selected data chunk has a compression ratio less than the compression ratio threshold, a load on the destination system is greater than or equal to the second threshold load, and/or a size of the chunk compression group that includes the selected data chunk may cause the network connection to become a bottleneck.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving at a storage system a request to perform a data management operation with respect to an object that was backed up to the storage system;
determining to send a selected data chunk associated with the object to a destination system;
identifying a chunk compression grouping storing the selected data chunk associated with the object, wherein the identified chunk compression grouping includes a plurality of data chunks compressed together, wherein the identified chunk compression grouping is stored at the storage system, wherein the identified chunk compression grouping includes the selected data chunk associated with the object and one or more data chunks associated with one or more other objects that were backed up to the storage system;
determining which data content version that includes the selected data chunk associated with the object from a plurality of data content versions to provide to the destination system at least in part by:
determining a compression ratio associated with the identified chunk compression grouping and comparing the determined compression ratio associated with the identified chunk compression grouping to a compression threshold;
determining a load associated with the storage system and comparing the determined load associated with the storage system to a threshold load,
wherein the plurality of data content versions includes a first data content version that includes the selected data chunk associated with the object and the one or more data chunks associated with one or more other objects, a second data content version that includes a compressed version of the selected data chunk that is generated by decompressing the identified chunk compression grouping, extracting the selected data chunk from the decompressed chunk compression grouping, compressing the selected data chunk, and encrypting the compressed selected data chunk, and a third data content version that includes an uncompressed version of the selected data chunk that is generated by decompressing the identified chunk compression grouping, extracting the selected data chunk from the decompressed chunk compression grouping, and encrypting the extracted selected data chunk; and performing the data management operation at least in part by providing from the storage system to the destination system the determined data content version that includes the selected data chunk associated with the object based on comparing the determined compression ratio associated with the identified chunk compression grouping to the compression threshold and comparing the determined load associated with the storage system to the threshold load.

2. The method of claim 1, wherein the determined data content version is the first data content version that includes the identified chunk compression grouping storing the selected data chunk associated with the object and the one or more data chunks associated with one or more other objects.

3. The method of claim 1, wherein determining which data content version that includes the selected data chunk associated with the object from the plurality of data content versions to provide to the destination system includes determining one or more conditions associated with providing the chunk compression grouping storing the selected data chunk associated with the object.

4. The method of claim 3, wherein the one or more conditions are associated with at least one of: the compression ratio associated with the identified chunk compression grouping, the load on the storage system, a load on the destination system, or available network bandwidth.

5. The method of claim 3, further comprising determining to provide the data content version based on the one or more conditions indicating to provide the chunk compression grouping storing the selected data chunk associated with the object.

6. The method of claim 3, further comprising decompressing the chunk compression grouping storing the selected data chunk associated with the object based on the one or more conditions indicating not to provide the first data content version.

7. The method of claim 6, further comprising extracting the selected data chunk associated with the object from the decompressed chunk compression grouping.

8. The method of claim 7, further comprising determining whether the one or more determined conditions and a corresponding compression ratio associated with the selected data chunk indicate to compress the selected data chunk.

9. The method of claim 8, further comprising determining to compress the selected data chunk in response to determining that the one or more determined conditions and the compression ratio associated with the selected data chunk indicate to compress the selected data chunk.

10. The method of claim 8, further comprising determining to provide the selected data chunk in response to determining that the one or more determined conditions and the compression ratio associated with the selected data chunk do not indicate to compress the selected data chunk.

11. A computer program product embodied in a non-transitory computer readable medium and comprising computer instructions for:
receiving at a storage system a request to perform a data management operation with respect to an object that was backed up to the storage system;
determining to send a selected data chunk associated with the object to a destination system;
identifying a chunk compression grouping storing the selected data chunk, wherein the identified chunk compression grouping includes a plurality of data chunks compressed together, wherein the identified chunk compression grouping is stored at the storage system, wherein the identified chunk compression grouping includes the selected data chunk associated with the object and one or more data chunks associated with one or more other objects that were backed up to the storage system;
determining which data content version that includes the selected data chunk associated with the object from a plurality of data content versions to provide to the destination system at least in part by:
determining a compression ratio associated with the identified chunk compression grouping and comparing the determined compression ratio associated with the identified chunk compression grouping to a compression threshold;
determining a load associated with the storage system and comparing the determined load associated with the storage system to a threshold load, wherein the plurality of data content versions includes a first data content version that includes the selected data chunk associated with the object and the one or more data chunks associated with one or more other objects, a second data content version that includes a compressed version of the selected data chunk that is generated by decompressing the identified chunk compression grouping, extracting the selected data chunk from the decompressed chunk compression grouping, compressing the selected data chunk, and encrypting the compressed selected data chunk, and a third data content version that includes an uncompressed version of the selected data chunk that is generated by decompressing the identified chunk compression grouping, extracting the selected data chunk from the decompressed chunk compression grouping, and encrypting the extracted selected data chunk; and
performing the data management operation at least in part by providing from the storage system to the destination system the determined data content version that includes the selected data chunk associated with the object based on comparing the determined compression ratio associated with the identified chunk compression grouping to the compression threshold and comparing the determined load associated with the storage system to the threshold load.

12. A system, comprising:
one or more processors associated with a storage system, wherein the one or more processors are configured to:
receive a request to perform a data management operation with respect to an object that was backed up to the storage system;
determine to send a selected data chunk associated with the object to a destination system;
identify a chunk compression grouping storing the selected data chunk associated with the object, wherein the identified chunk compression grouping includes a plurality of data chunks compressed together, wherein the identified chunk compression grouping is stored at the storage system, wherein the identified chunk compression grouping includes the selected data chunk associated with the object and one or more data chunks associated with one or more other objects that were backed up to the storage system; and
determine which data content version that includes the selected data chunk associated with the object from a plurality of data content versions to provide to the destination system at least in part by:

determine a compression ratio associated with the identified chunk compression grouping and compare the determined compression ratio associated with the identified chunk compression grouping to a compression threshold;

determine a load associated with the storage system and comparing the determined load associated with the storage system to a threshold load, wherein the plurality of data content versions includes a first data content version that includes the selected data chunk associated with the object and the one or more data chunks associated with one or more other objects, a second data content version that includes a compressed version of the selected data chunk that is generated by decompressing the identified chunk compression grouping, extracting the selected data chunk from the decompressed chunk compression grouping, compressing the selected data chunk, and encrypting the compressed selected data chunk, and a third data content version that includes an uncompressed version of the selected data chunk that is generated by decompressing the identified chunk compression grouping, extracting the selected data chunk from the decompressed chunk compression grouping, and encrypting the extracted selected data chunk; and perform the data management operation at least in part by providing from the storage system to the destination system the determined data content version that includes the selected data chunk associated with the object based on a first comparison of the determined compression ratio associated with the identified chunk compression grouping to the compression threshold and a second comparison of the determined load associated with the storage system to the threshold load; and a memory coupled to at least a portion of the one or more processors and configured to provide the at least the portion of the one or more processors with instructions.

13. The method of claim 2, wherein the first data content version is determined to be provided in response to determining that the compression ratio associated with the identified chunk compression grouping is greater than or equal to the compression threshold and the load associated with the storage system is greater than the threshold load.

14. The method of claim 1, wherein the second data content version is the determined data content version.

15. The method of claim 14, wherein the second data content version is determined to be provided in response to determining that the compression ratio associated with the identified chunk compression grouping is greater than or equal to the compression threshold and the load associated with the storage system is less than the threshold load.

16. The method of claim 1, wherein the third data content version is the determined data content version.

17. The method of claim 16, wherein the third data content version is determined to be provided in response to determining that the compression ratio associated with the identified chunk compression grouping is less than the compression threshold.

* * * * *